United States Patent
Gambini et al.

[11] Patent Number: 5,917,633
[45] Date of Patent: Jun. 29, 1999

[54] METHOD OF AND DEVICE FOR CONTROLLING THE PHASE OF A CLOCK SIGNAL IN A POINT-TO-POINT OPTICAL TRANSMISSION

[75] Inventors: Piero Gambini, Turin; Mario Puleo, Borgosesia, both of Italy

[73] Assignee: CSELT- Centro Studi E Laboratori Telecomunicazioni S.p.A., Turin, Italy

[21] Appl. No.: 08/954,953

[22] Filed: Oct. 21, 1997

[30] Foreign Application Priority Data

Nov. 7, 1996 [IT] Italy .................................. TO96A0896

[51] Int. Cl.$^6$ .................................................. H04B 10/00
[52] U.S. Cl. .......................... 359/158; 359/161; 359/177; 359/140; 359/110; 359/187; 359/183; 359/173; 359/132; 359/153
[58] Field of Search ..................................... 359/161, 177, 359/140, 110, 187, 158, 183, 173, 132, 153

[56] References Cited

U.S. PATENT DOCUMENTS

| | | | |
|---|---|---|---|
| 5,546,032 | 8/1996 | Yatagai | 327/165 |
| 5,561,542 | 10/1996 | Kosugi et al. | 359/118 |
| 5,673,133 | 9/1997 | Imaoka et al. | 359/189 |
| 5,717,510 | 2/1998 | Ishikawa et al. | 359/161 |

OTHER PUBLICATIONS

OFC/IOOC '93 Technical Digest, Thursday Morning, ThC6 9:45, pp. 172–173.

*Primary Examiner*—Leslie Pascal
*Attorney, Agent, or Firm*—Herbert Dubno

[57] ABSTRACT

The signal to be controlled is sent along an optical fiber by a wavelength tunable laser whose emission wavelength may be varied as a function of a possible phase variation in the received signal with respect to a reference phase. At the receiving end of the fiber a control signal is generated by extracting a fraction of the power associated with the received signal and sending such fraction back towards the transmitting end, and at the transmitting end the phase of the fraction is compared with that of the original signal and the tunable laser is driven in such a way as to transmit a wavelength such that the clock information reaches the receiving end with the reference phase.

10 Claims, 4 Drawing Sheets

METHOD OF AND DEVICE FOR CONTROLLING THE PHASE OF A CLOCK SIGNAL IN A POINT-TO-POINT OPTICAL TRANSMISSION

FIELD OF THE INVENTION

The present invention relates to synchronisation of communication and measurement systems and, more specifically, to a method of and a device for controlling the phase of a clock signal transferred over an optical between two points of a system.

BACKGROUND OF THE INVENTION

In many applications, such as synchronous digital communications, metrology, etc. there is a need to transmit a highly stable clock signal from one point to another of the communication network or of the measurement system, e.g. from the generator of a main system clock signal to a utilization point. This signal can be transferred in many ways, e.g. via radio, by means of microwave links or through optical fibers. Clearly the latter way is adopted in digital communication systems which use optical fibers as physical carriers, e.g. the SDH (Synchronous Digital Hierarchy) networks. The clock signal can be transmitted explicitly, or it may be implicit in the data stream of a digital transmission and represent the timing of that stream.

For the sake of simplicity, the following description shall, in both cases, refer to "clock signals" or "clock information".

In the aforesaid applications, clock signals must be highly stable not only in frequency but also in phase and, considering by way of non limiting example digital communication systems, international standards set strict limits to the phase fluctuations of these signals. If clock signals are transmitted over an optical fiber, the phase of the signal received by the user is influenced by the variations in the length of the optical path and it depends essentially on temperature variations along the fiber. As is well known, this phase is given by $\Phi = 2\pi f \tau$, where f is the frequency of the clock signal to be transferred and $\tau$ is the propagation time along the fiber, in turn given by $\tau = n_g L/c$, where $n_g$ is the group refractive index (which depends on wavelength and temperature) and L is the length of the fiber, which also depends on temperature. In particular, the dependence of $n_g$ on temperature and wavelength and the dependence of L on temperature can be expressed by relations:

$$n_g(\lambda, T) = n_{g0} + (\lambda - \lambda_0)\frac{\partial n_g}{\partial \lambda} + (T - T_0) \cdot \frac{\partial n_g}{\partial T} \quad (1)$$

$$L(T) = L_0 + (T - T_0)\frac{\partial L}{\partial T} \quad (2)$$

where the terms with index "0" indicate the value of the respective parameter at given reference wavelength and temperature $\lambda_0$, $T_0$.

Since in conventional optical fiber transmission systems wavelength is usually fixed, it can be clearly seen that the sole parameter influencing the phase is temperature T.

SUMMARY OF THE INVENTION

According to the invention, a method and a device are provided which exploit the transmission of an optical signal by means of a wavelength tunable transmitter to obtain an automatic and precise lock of the phase of the received signal to that of the transmitted signal in a point-to-point optical connection.

In the method, the clock signal is sent along a transmission line, comprising at least a first optical fiber, by means of a wavelength tunable laser whose emission wavelength can be varied as a function of a possible variation in the phase. At of the received signal with respect to a reference phase; at the receiving end of the system a control signal is generated by extracting a fraction of the power associated with the clock signal received and sending it back towards the transmitting end of the system, and at said transmitting end the phase of said fraction is compared with the phase of the original signal and the tunable laser is driven in such a way as to transmit at a wavelength such that the clock signal reaches the receiving end with the reference phase.

The device comprises: a wavelength tunable laser which sends the clock signal along a transmission line comprising at least a first optical fiber and whose emission wavelength may vary as a function of a possible variation in the phase of the received signal with respect to a reference phase; means, located at the receiving end of the transmission line, for extracting a fraction of the received signal and sending back that fraction to the transmitting end of the line as a control signal, and means, located at said transmitting end, for comparing the phase of the control signal and that of the transmitted signal and for driving the tunable laser to make it transmit at a wavelength such that the clock signal reaches the receiving end with the reference phase.

Systems for imposing pre-set delays to optical signals propagating along an optical fiber, where use is made of wavelength tunable lasers controlled by signals representative of the delay to be imposed, are known from the paper "Continuously variable true-time-delay modulator", presented by L. Dexter et al. at the OFC/IOOC '93 conference, San Jose (Calif., USA), 21–26 Feb. 1993, paper ThC6, and from European patent application EP-A-0 658 994.

BRIEF DESCRIPTION OF THE DRAWING

For the sake of further clarification, reference is made to the attached drawings, in which.

SPECIFIC DESCRIPTION

Figure 1:
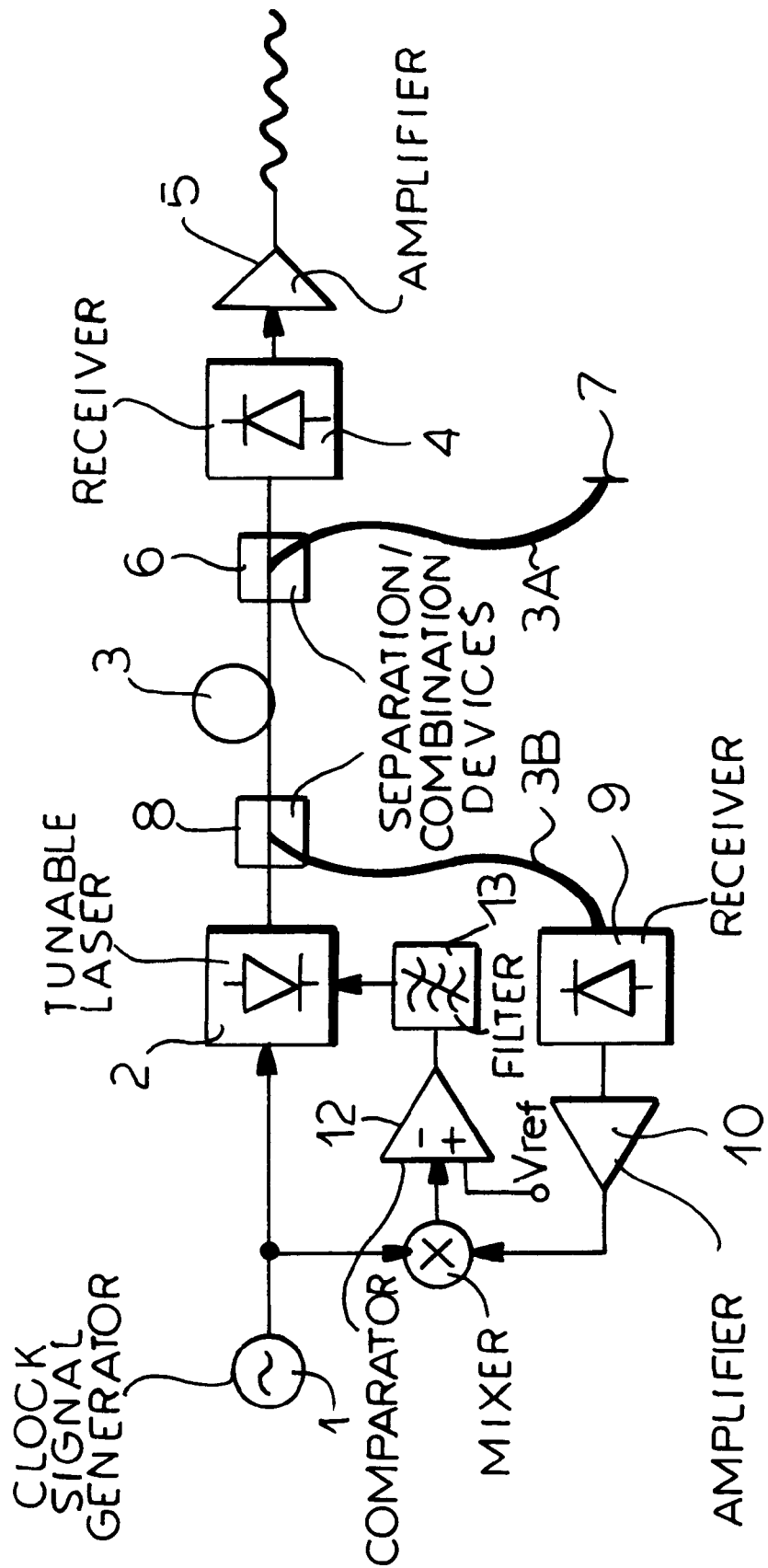
FIGS. 1 and 2 show two embodiments of the apparatus according to the invention, in the case in which the clock signal is transmitted explicitly.

With reference to FIG. 1, at the transmitting end of a point-to-point connection a generator 1 of clock signals in electrical form (e.g. a highly stable oscillator) modulates in amplitude the carrier generated by a wavelength tunable laser 2, which generates an optical signal corresponding to the electrical clock signal. Laser 2 sends that optical signal to a receiver 4, by means of an optical fiber 3 which is part, for instance, of an optical cable constituting the information transmission line. The clock signal is reconverted into electrical form by receiver 4 and, after being amplified in an amplifier 5, is then sent to the utilization devices (not shown). Immediately upstream of receiver 4 a separation/recombination device 6 (for instance, a fiber coupler, as shown in the drawing, or a partially transparent mirror) is provided, which extracts a fraction of the optical signal and sends it towards a mirror 7, through a fiber span 3A. This fraction is reflected by mirror 7 into fiber 3A and is transmitted back along fiber 3 towards the transmitting end, thereby constituting a control signal. At the transmitting end, a second separation/recombination device 8, similar to device 6, extracts the control signal and sends it, through a fiber span 3B, towards a second receiver 9, which reconverts the control signal into electrical form and provides the converted signal to a second amplifier 10. The control signal thus amplified is compared in phase to the clock signal emitted by source 1 in a phase comparator comprising radio frequency mixer 11 and voltage comparator 12. The error signal, through a loop filter 13, drives tunable laser 2 to make it emit at a wavelength such that the signal reaches the receiver with the required phase.

Figure 2:
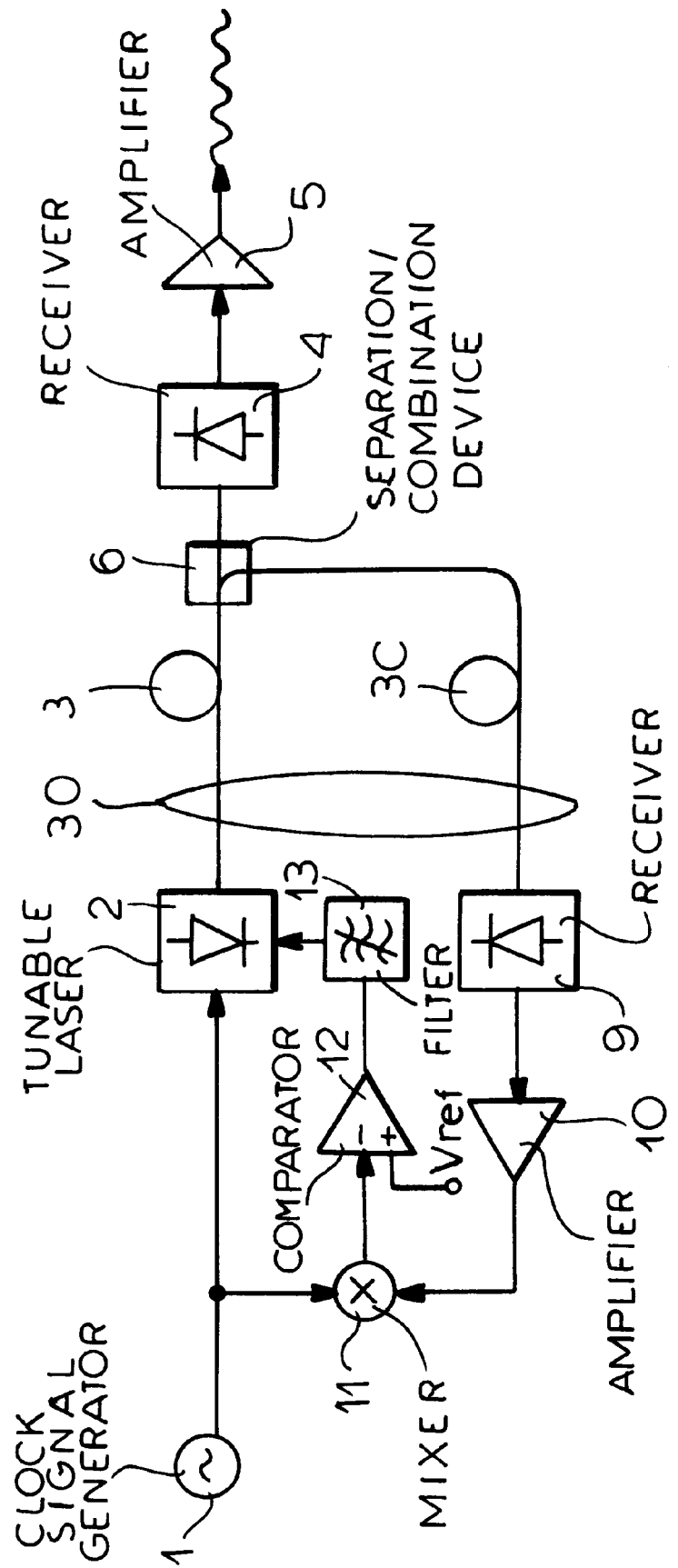

In the variant shown in FIG. 2, the output of the separation/recombination device 6 conveying the signal fraction used to generate the control signal is connected to a second optical fiber 3C, distinct from fiber 3, which carries the control signal directly back to the transmitting end of the system. Fibre 3C shall belong to the same cable 30 as fiber 3 so that, given its physical proximity, its behavior, from the view point of temperature effects, is essentially the same as that of fiber 3. Otherwise, the set up is identical to that of FIG. 1, aside from the obvious elimination of separation/recombination device 8 and mirror 7.

The variant shown in FIG. 2 has the advantage of minimizing any multiple reflection phenomena due to the couplers or to the mirrors.

Figure 3:
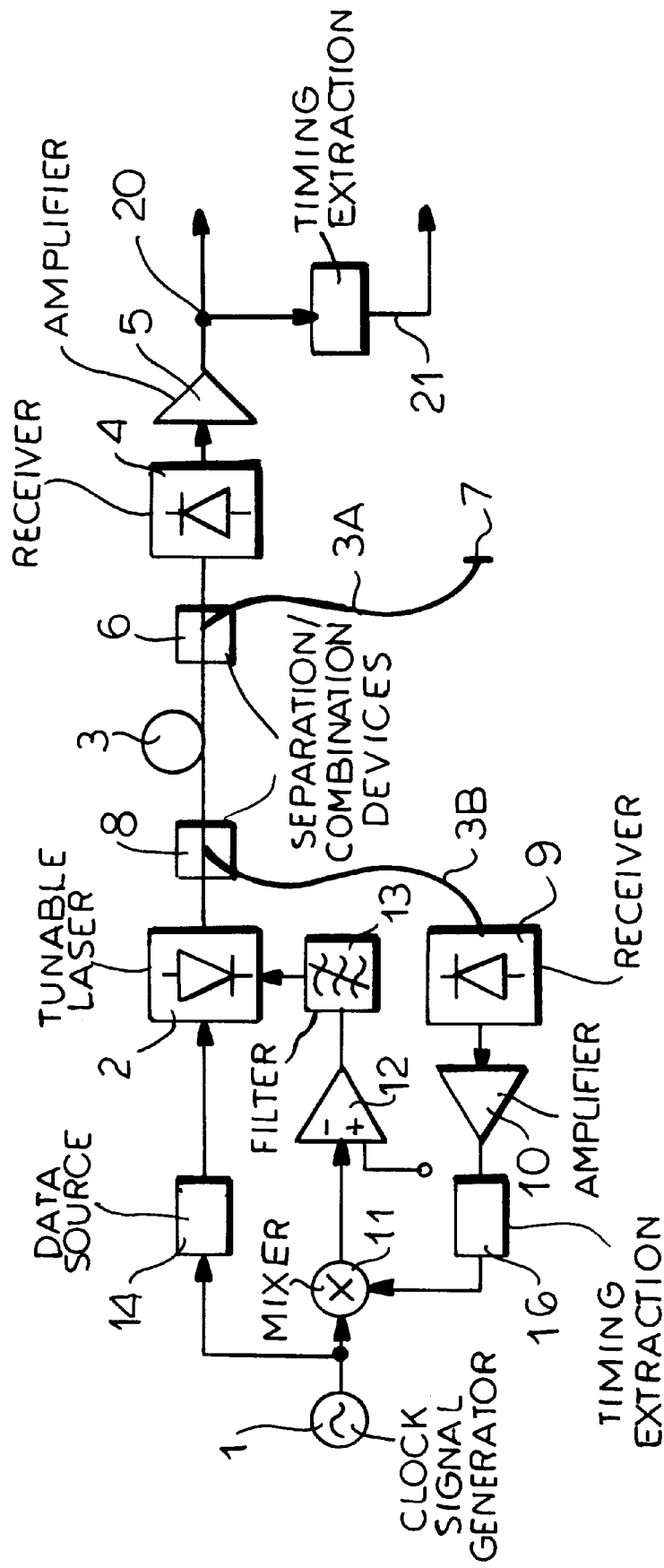
FIG. 3 shows the apparatus according to the invention in the case in which the clock signal is implicit in the data stream of a digital transmission.

In the embodiment shown in FIG. 3, the clock signal emitted by generator 1, instead of being transmitted directly on fiber 3, is to time a digital data stream emitted by a data source 14, and the carrier generated by laser 2 is modulated by the data stream. The clock signal is thus implicit. Amplifier 5 sends the data to the utilization devices (output 20) and to a first timing extraction circuit 15 which recovers the clock signal from the data stream and sends it to the utilization devices (output 21). A second timing extraction circuit 16, identical to circuit 15, recovers the clock signal from the control signal and sends it to mixer 12, for comparison with the phase of the signal generated by generator 1. The remainder of the apparatus is identical to that of FIG. 1.

Obviously, in this case too the control signal can be sent back towards the transmitter by means of a second fiber 3C of cable 30, similarly to what is shown in FIG. 2.

It can immediately be seen that, once the phase of the control signal is locked to that of the transmitted signal, the phase of the received signal also remains constant. In effect, considering the phase of the signal exiting oscillator 1 equal to 0, phases F1, F2 of the signal at the receiving end of the connection and of the control signal, as the latter is received at the transmitting end, shall respectively be $2\pi f\tau$ and $4\pi f\tau$. By indicating by $c\pi_o$ the propagation time corresponding to the reference conditions and taking into account relations (1) and (2), propagation time $\tau$ at a wavelength I and at a temperature T is expressed, as a function of $t_0$, $I_0$, $T_0$ and $L_0$, by a relation of the following kind:

$$\tau = \tau_0 + L_0 \cdot a \cdot (\lambda - \lambda_0) + L_0 \cdot b \cdot (T - T_0)$$

$$\text{where } a = \frac{1}{c} \cdot \frac{\partial n_g}{\partial \lambda} \text{ and } b = \frac{1}{c} \cdot \left( \frac{\partial n_g}{\partial T} + \frac{1}{L_0} \cdot \frac{\partial L}{\partial T} \cdot n_{g0} \right).$$

To obtain the required phase at the receiving end, it will be necessary to impose the condition that $t=t_0$ and therefore that $$L_0 \cdot a \cdot (\lambda - \lambda_0) + L_0 \cdot b \cdot (T - T_0)$$

This condition is obtained by controlling the tunable laser so that it transmits at a wavelength $$\lambda = \lambda_0 - (b/a) \cdot (T - T_0)$$

For a conventional single mode fiber and a transmission in the third window (around 1550 nm), a≡17 ps/(nm·Km) and b≡40 ps/° C·Km, so that $$\lambda = \lambda_0 - 2.2 \; nm/°C \cdot (T - T_0)$$

Figure 4:
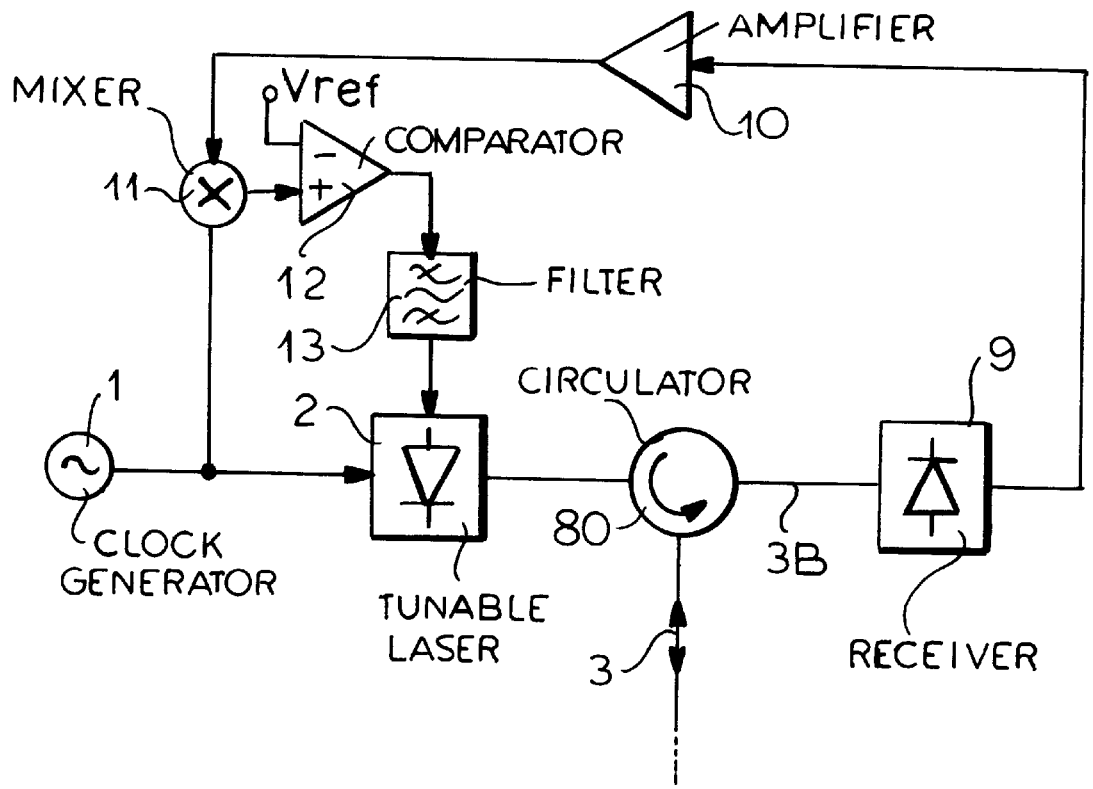
FIGS. 4 and 5 show two variants.
Figure 5:
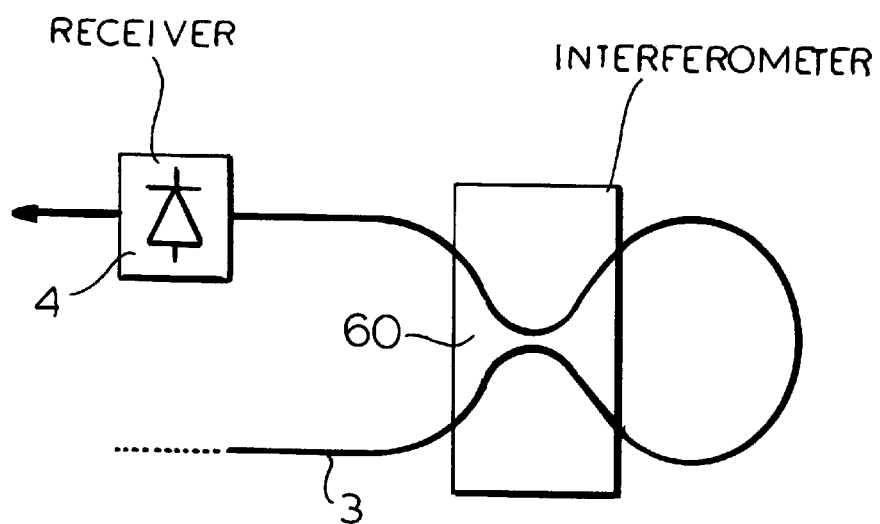

It is evident that the description above is provided solely by way of non limiting example, and that variations and modifications are possible without departing from the scope of the invention. Thus, as shown in FIG. 4, coupler 6 can replaced by a three-port circulator 80 which has a unidirectional input port connected to the output of laser 2, a bidirectional input/output port connected to fiber 3 and a unidirectional output port connected to receiver 9. This arrangement has the advantage of eliminating the losses inherent in the use of an optical coupler. To the same end, mirror 7 in FIGS. 1 and 3 can be replaced by a Sagnac interferometer 60, as shown in FIG. 5. Moreover, although the drawings show the direct modulation of laser 2 by the clock signal emitted by generator 1 or by the data signal emitted by source 14, the carrier emitted by laser 2 could be modulated by means of an external modulator.

We claim:

1. A method of controlling the phase of clock information in a point-to-point transmission system, comprising the steps of:
    (a) sending said clock information over an optical transmission line at a transmitting end having at least a first optical fiber by means of a wavelength tunable laser whose emission wavelength is varied as a function of variation in the phase of received information with respect to a reference phase;
    (b) extracting at a receiving end of the system a fraction of the power associated with the clock information received and sending the clock information back towards the transmitting end of the system to generate a control signal, and
    (c) at said transmitting end comparing the phase of said fraction with the phase of the original information and driving the tunable laser to make the tunable laser transmit at a wavelength such that the clock information reaches the receiving end with the reference phase.

2. The method defined in claim 1 wherein the control signal is transmitted over a second optical fiber located in very close physical proximity to the first fiber, in order to be subject to the same temperature conditions.

3. The method defined in claim 2 wherein said first and second optical fibers belong to a common optical cable which constitutes the transmission line of the system.

4. The method defined in claim 1 wherein said clock information is represented by a clock signal generated by a generator and transmitted explicitly.

5. The method defined 1 wherein said clock information is represented by the timing of a digital data stream transmitted over said transmission line and timed by a clock signal generated by a generator and wherein a fraction of the power associated with the data stream is utilized as the control signal and the clock signal is extracted from the control signal at the transmitting end.

6. A device for controlling the phase of a clock information in a point-to-point transmission system, comprising:
    a wavelength tunable laser of an emission wavelength varying as a function of a possible variation in phase of received information with respect to a reference phase; a transmission line for said clock connected to said tunable laser and comprising at least a first optical fiber at a receiving end of the transmission line means for extracting a fraction of the power associated with received information and means for sending said fraction back to a transmitting end of the line as a control signal; and at said transmitting end means for comparing a phase of the control signal to a phase of the transmitted clock information and for driving the tunable laser to make said tunable laser transmit at a wavelength such that the clock information reaches the receiving end with the reference phase.

7. The device defined in claim 6 wherein the means for sending the control signal towards the transmitting end of the fiber comprises a second optical fiber, located in close physical proximity to the first optical fiber, so as to be subject to the same temperature conditions therewith.

8. The device defined in claim 7 wherein the first and second optical fibers belong to a common optical cable which constitutes the transmission line.

9. The device defined in claim 6 wherein said tunable laser converts into optical form and sends along the line a clock signal generated by a generator.

10. The device defined in claim 6 wherein said tunable laser converts into optical form and sends along the line a digital data stream emitted by a source and timed by a clock signal generated by a generator, and the means for extracting a fraction of the power associated with the received information and for sending such fraction back to the transmitting end of the line are arranged to generate the control signal starting from a fraction of the power associated with the data stream, and the means for comparing also comprises a circuit for extracting a timing from the control signal.

* * * * *